US011858197B2

(12) United States Patent
Gantenbein et al.

(10) Patent No.: US 11,858,197 B2
(45) Date of Patent: Jan. 2, 2024

(54) ADDITIVE MANUFACTURING USING THERMOTROPIC LIQUID CRYSTALLINE POLYMER

(71) Applicant: ETH Zürich, Zürich (CH)

(72) Inventors: Silvan Gantenbein, Zürich (CH); Kunal Masania, Oegstgeest (NL); Theo Tervoort, Zürich (CH); André R. Studart, Zürich (CH); Jens P. W. Sesseg, Gauting (DE); Wilhelm Woigk, Zürich (CH)

(73) Assignee: ETH Zürich, Zurich (CH)

( * ) Notice: Subject to any disclaimer, the term of this patent is extended or adjusted under 35 U.S.C. 154(b) by 68 days.

(21) Appl. No.: 17/253,389

(22) PCT Filed: Jun. 21, 2019

(86) PCT No.: PCT/EP2019/066473
§ 371 (c)(1),
(2) Date: Dec. 17, 2020

(87) PCT Pub. No.: WO2019/243575
PCT Pub. Date: Dec. 26, 2019

(65) Prior Publication Data
US 2021/0323219 A1 Oct. 21, 2021

(30) Foreign Application Priority Data
Jun. 22, 2018 (EP) ..................... 18179376

(51) Int. Cl.
B29C 64/118 (2017.01)
B29K 67/00 (2006.01)
(Continued)

(52) U.S. Cl.
CPC .......... B29C 64/118 (2017.08); B29C 64/209 (2017.08); B29C 64/295 (2017.08);
(Continued)

(58) Field of Classification Search
CPC ... B29C 64/118; B29C 64/295; B29C 64/209; B29C 71/02
See application file for complete search history.

(56) References Cited

U.S. PATENT DOCUMENTS 9,186,848 B2    11/2015   Mark et al.

FOREIGN PATENT DOCUMENTS

| EP | 0 668 379 A1 | 8/1995 |
| JP | 9-249798 A | 9/1997 |
| JP | 2017-25187 A | 2/2017 |

OTHER PUBLICATIONS

Robert W. Gray IV, et al., "Effect of processing conditions on short TLCP fiber reinforced FDM parts", Rapid Prototyping Journal, Emerald Insight, 1998, pp. 14-25, vol. 4, issue 1.
(Continued)

Primary Examiner — Joseph S Del Sole
Assistant Examiner — John Robitaille
(74) Attorney, Agent, or Firm — Sughrue Mion, PLLC

(57) ABSTRACT

An additive manufacturing process for the manufacture of an object in an additive manufacturing apparatus, wherein the object is formed by one or several individual solid filamentous units. The additive manufacturing process comprises the steps of discharging a polymer composition in a molten state from a nozzle of a print head, thereby imparting an orienting flow on the polymer composition in a molten state being discharged from the nozzle of the print head and depositing said discharged polymer composition in a molten state along at least one predefined path and allowing the thus formed one or several filamentous units to solidify such as to form one or several solid filamentous units of the object to be manufactured. Optionally, the previous step may be repeated until the object is formed. The polymer composi-
(Continued)

tion comprises a thermotropic liquid crystal polymer as the polymer component of the polymer composition.

22 Claims, 7 Drawing Sheets

(51) Int. Cl.
    *B29C 64/295*     (2017.01)
    *B29C 64/209*     (2017.01)
    *B29C 71/02*     (2006.01)
    *B33Y 10/00*     (2015.01)
    *B33Y 30/00*     (2015.01)
    *B33Y 70/00*     (2020.01)
    *B33Y 40/20*     (2020.01)

(52) U.S. Cl.
    CPC ........ *B29C 71/02* (2013.01); *B29C 2071/022* (2013.01); *B29K 2067/00* (2013.01); *B33Y 10/00* (2014.12); *B33Y 30/00* (2014.12); *B33Y 40/20* (2020.01); *B33Y 70/00* (2014.12)

(56) References Cited

OTHER PUBLICATIONS

International Search Report for PCT/EP2019/066473 dated Sep. 9, 2019 [PCT/ISA/210].
Written Opinion for PCT/EP2019/066473 dated Sep. 9, 2019 [PCT/ISA/237].

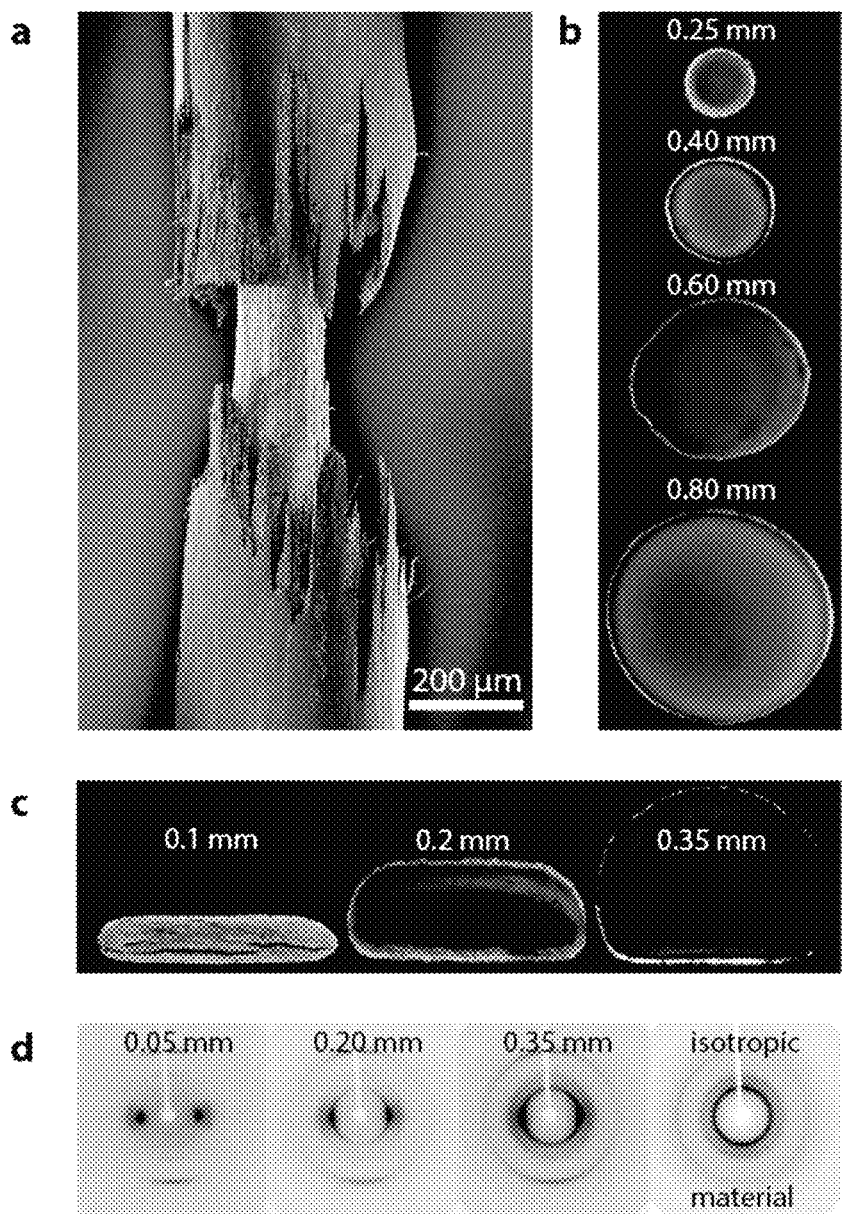
FIG. 1 a-d

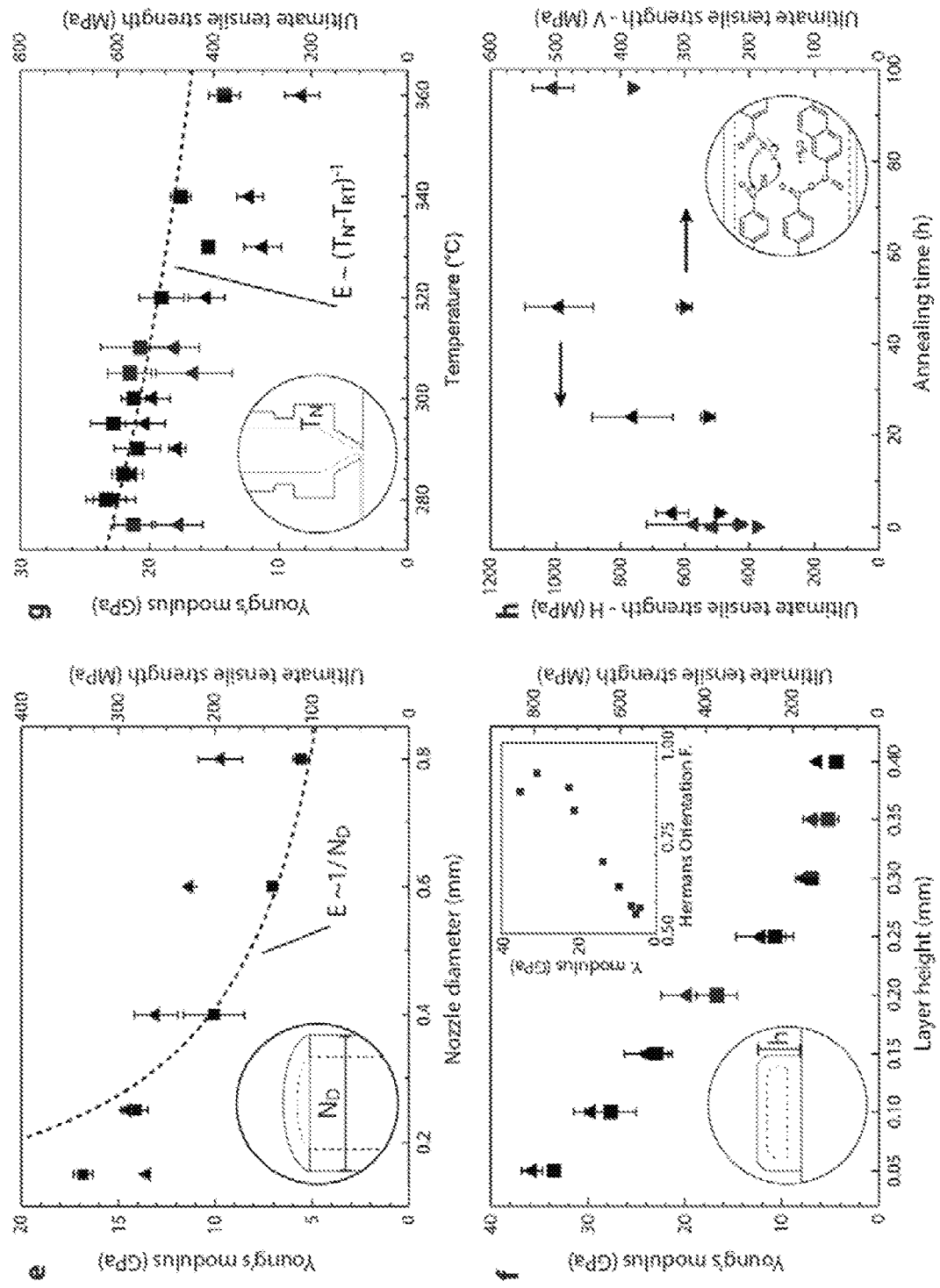
FIG. 1 e-h

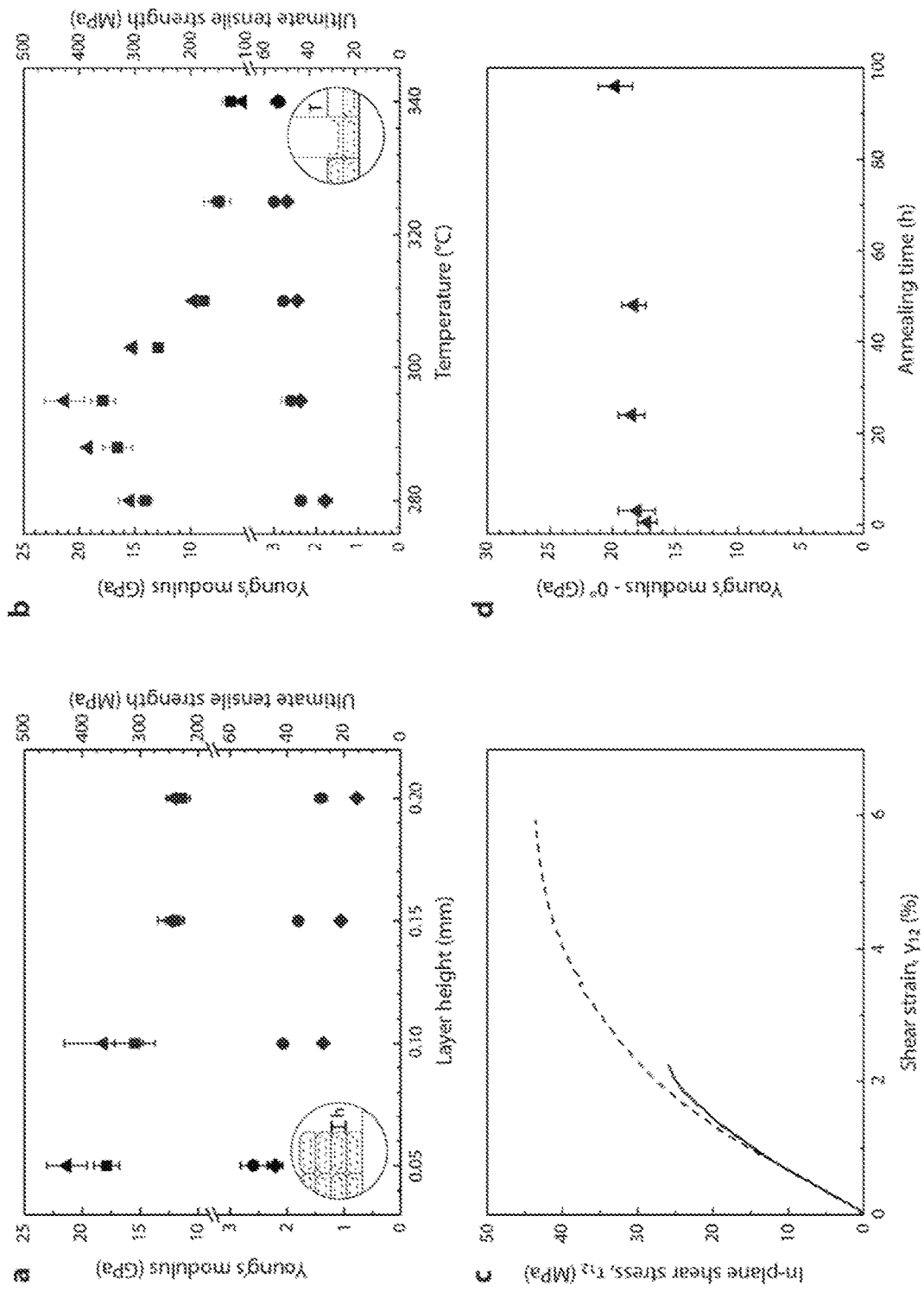
FIG. 5 a-d

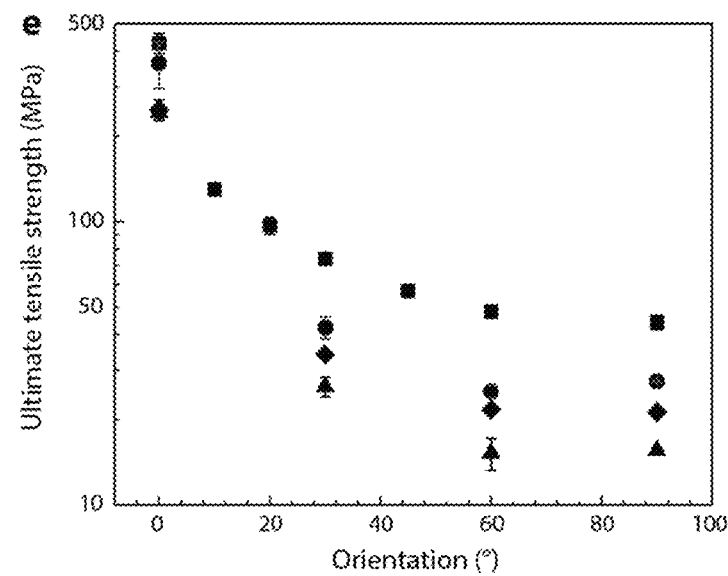
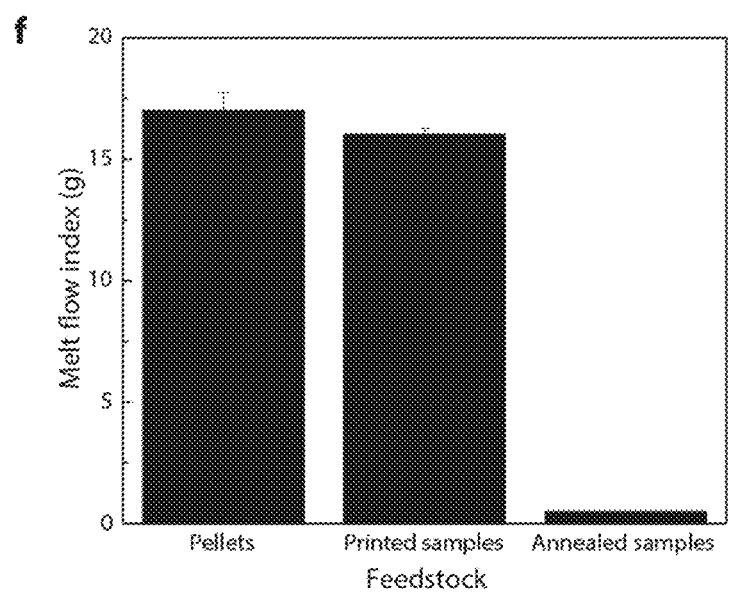
FIG. 5 e-f

ADDITIVE MANUFACTURING USING THERMOTROPIC LIQUID CRYSTALLINE POLYMER

TECHNICAL FIELD

The present invention relates to an additive manufacturing process, in particular to fused deposition modelling (FDM) or fused filament fabrication (FFF), for the manufacture of a three-dimensional object using a thermotropic liquid crystalline polymer or compositions thereof.

PRIOR ART

Structural materials that combine low weight with high mechanical properties are crucial for the manufacturing of fuel-saving vehicles, biomedical implants and energy-harvesting structures. The increasing use of fibre-reinforced polymers as lightweight composite materials in aircrafts, automobiles and wind turbines relies strongly on the production of stiff and strong fibres which must successfully be combined with a polymer matrix. High stiffness and strength are usually reached using intrinsically strong fibre materials such as silica glass or polymers with a high degree of molecular orientation, such as high-performance polyethylene-, aramid- or carbon fibres. The molecular orientation needed to produce strong fibres is achieved by spinning processes that typically include flow orientation and subsequently stretching the material several orders of magnitude. Lightweight composites are then obtained by infiltrating pre-assembled fibres with a softer polymer matrix or by blending loose fibres into the softer polymer matrix. Although the resulting materials can exhibit very high strength and stiffness, the energy- and labour-intensive fabrication process, the difficulty to recycle and the typically brittle fracture of state-of-the-art composites present major challenges today.

To overcome some of these challenges of intensive fabrication and cumbersome recycling, methods have been developed to produce highly-oriented single-phase polymer structures, such as solid-state drawn polypropylene tapes or spintruded liquid crystal polymers (LCP) foils. These tapes or foils can then be assembled by hot pressing into 3D monolithic parts that combine recyclability with enhanced mechanical properties. Unfortunately, objects produced using these processes are restricted to simple geometries such as plates, shells and stacked sheets displaying increased mechanical properties in single directions.

Polymer objects with far more complex geometries can nowadays be produced using 3D printing technologies, such as fused deposition modelling (FDM). However, this freedom in design typically comes at the cost of inferior mechanical performance. In contrast to the spinning processes, current FDM printers utilize polymers that are less prone to molecular orientation and crystallization to prevent the build-up of residual stresses and warping. Performance polymers such as acrylonitrile butadiene styrene (ABS) and polylactide (PLA) are thus typical feedstock materials. Higher levels of crystallinity and mechanical properties can be achieved by printing with high-performance polyether ether ketone (PEEK) utilizing heated print chambers. However, the low molecular orientation and poor line adhesion reduces significantly the overall mechanical properties of the printed parts in comparison to injection-moulded engineering materials. These issues have severely limited the applicability of 3D printed polymers as lightweight structures in demanding load-bearing applications. In this context, manufacturing routes that reconcile the shaping freedom of 3D printing with high mechanical properties obtained through molecular orientation, enhanced filament adhesion and high recyclability are currently unavailable.

While it is known that liquid crystal polymers (LCP), for example based on thermotropic polyesters such as VECTRA®, can be 3D printed into lightweight structures that are fully recyclable, the mechanical properties of known 3D printed structures fall significantly short of mechanical properties that could theoretically be achieved.

Robert W. Gray, Donald G. Baird, Jan Helge Bohn, (1998) "Effects of processing conditions on short TLCP fiber reinforced FDM parts", Rapid Prototyping Journal, Vol. 4 Issue: 1, pp. 14-25, discloses a process of fused deposition modelling (FDM) using a Stratasys FDM 1600 system in which the deposited material is a polypropylene matrix reinforced with chopped short fibres of a thermotropic liquid crystalline polymer (TLCP) commercially available under the trademark VECTRA A950. Equally, a process of fused deposition modelling for pure TLCP is disclosed in which plaques are manufactured by depositing a melt of TLCP across a nozzle orifice having a diameter of 0.64 mm. While pure TLCP objects manufactured in this way are easily recyclable, the mechanical properties of the pure TLCP plaques obtained by FDM were however inferior to either injection moulded plaques of pure TLCP or spun-drawn TLCP filaments.

EPO 668 379 A1 discloses a process of melt spinning liquid crystal polymers randomly onto a mould to form non-woven webs of liquid crystal polymers to obtain a moulded object.

U.S. Pat. No. 9,186,848 B2 discloses additive manufacturing using so-called "tow-pregs" as feeding filaments, heating the "tow-pregs" such that polymer composition surrounding the continuous roving of solid core thread melts and wets the solid core thread and depositing the solid, heated "tow-pregs" to form an object.

Thus, there currently exists a need to provide an additive manufacturing method in which the mechanical properties of objects made of TLCP can further be increased when compared to existing TLCP-made objects, which at the same time can be recycled in a simple manner.

SUMMARY OF THE INVENTION

The desired combination of recyclability and mechanical properties is obtained by objects manufactured according to the additive manufacturing process of the present invention.

It is an object of the present invention to provide an additive manufacturing process for the manufacture of an object in an additive manufacturing apparatus, wherein the object is formed by one or several individual solid filamentous units, said additive manufacturing process comprising the steps of, discharging a polymer composition in a molten state from a nozzle of a print head, thereby imparting a flow on the polymer composition in a molten state being discharged and depositing said discharged polymer composition in a molten state along at least one predefined path, which can be a horizontal path, such as to form the one or several solid filamentous units of the object to be manufactured and optionally repeating the previous step until the object is formed in the case where the object is formed by several individual solid filamentous units; wherein said polymer composition comprises a thermotropic liquid crystal polymer as a polymer component of the polymer composition, characterized in that the smallest thickness of at least one solid filamentous unit is equal or less than 0.2 mm, preferably 0.15 mm and more preferably 0.10 mm. It is understood that the temperature at which the polymer composition in a molten state is discharged from a nozzle of a print head is a temperature at which the thermotropic liquid crystal polymer comprised in the polymer composition is in a molten state or a molten liquid crystalline state. Without wishing to be held to a particular theory, it is believed that imparting an oriented flow on the polymer composition in a molten state as it is being discharged leads to an orientation at the molecular level within the polymer component of the polymer composition and that this orientation is essentially retained when performing the additive manufacturing process according to the present invention.

It has been surprisingly found that when the polymer composition is extruded such that the smallest thickness of the one or several formed filamentous units is equal or less than 0.2 mm, the formed solid filamentous units and by extension, the object being manufactured, have greatly improved mechanical properties. Because physical characteristics, such as melt viscosity, heat capacity and thermal conductivity of known thermotropic liquid crystal polymers above the melting point are similar, it is foreseeable that the above requirement for maximal smallest thickness can be applied to all thermotropic liquid crystal polymers melts. The use of filamentous units having a diameter as recited above can be considered as a counterintuitive decision in the context of additive manufacturing, since in 3D printing in general, speed is a problem and reducing the amount of molten polymer composition deposited per path via diameter reduction is usually not considered, as it further increases the time needed to arrive at the object to be manufactured. However, in the case of polymer compositions comprising a thermotropic liquid crystal polymer as a polymer component of the polymer composition, the improvements in mechanical properties far outweigh the loss in production speed.

In a preferred embodiment of the additive manufacturing process for the manufacture of an object in an additive manufacturing apparatus, the polymer composition in a molten state is further actively cooled to form a solid filamentous subunit and is preferably actively cooled to form a solid filamentous subunit by forced convection.

In a preferred embodiment of the additive manufacturing process for the manufacture of an object in an additive manufacturing apparatus, the formed object is subsequently annealed in-situ or ex-situ of the 3D printer, at less than 100° C., more preferably less than 50° C., most preferred less than 25° C. below the melting temperature of the thermotropic liquid crystal polymer for up to 6 hours or from 2 to 6 hours, preferably up to 9 hours or from 6 to 9 hours, more preferably up to 12 hours or from 9 to 12 hours, more preferably up to 48 hours or from 12 to 48 hours and most preferably up to 96 hours or from 12 to 96 hours. Annealing was found to improve the adhesion between individual solid filamentous subunits or adjacent sections thereof, thus providing an object exhibiting enhanced mechanical stiffness and strength in combination with an advantageous energy absorbing saw-tooth break pattern in the stress-strain curve instead of a broom-like break pattern.

In a preferred embodiment of the additive manufacturing process for the manufacture of an object in an additive manufacturing apparatus, the polymer composition is discharged from a nozzle of the print head along a rectilinear or non-rectilinear path. When the polymer composition is discharged from a nozzle of the print head along such a path, it becomes possible to emulate bioinspired structures that have remarkable mechanical properties in a given setting.

In a preferred embodiment of the additive manufacturing process for the manufacture of an object in an additive manufacturing apparatus, the polymer composition being discharged in a molten state from a nozzle of a print head is in a molten liquid crystalline state, i.e. the thermotropic liquid crystal polymer of the polymer composition is in a molten liquid crystalline state. In the molten liquid crystalline state, the melt comprises a liquid crystal phase, whereas if the temperature is increased beyond a certain threshold the liquid crystal phase in the melt will become an isotropic liquid. Temperature ranges within which a given thermotropic liquid crystal polymer is in a molten liquid crystalline state can either be found in the literature or can be determined without undue burden by experimentation.

In a preferred embodiment of the additive manufacturing process for the manufacture of an object in an additive manufacturing apparatus, the thermotropic liquid crystal polymer is an aromatic polyester, preferably a polyester obtained by polycondensation of 4-hydroxybenzoic acid and 6-hydroxynaphthalene-2-carboxylic acid. Using a thermotropic liquid crystal polymer allows for easier recycling by melting. Thermotropic liquid crystal polymers obtained by polycondensation of 4-hydroxybenzoic acid and 6-hydroxynaphthalene-2-carboxylic acid exhibit good mechanical properties and align along the direction of extrusion.

In a preferred embodiment of the additive manufacturing process for the manufacture of an object in an additive manufacturing apparatus, the polymer composition being discharged in a molten state from a nozzle of a print head has a temperature not exceeding the melting temperature of thermotropic liquid crystal polymer by more than 100° C., preferably by more than 50° C., preferably by more than 25° C., preferably by more than 15° C., preferably by more than 10° C., and more preferably by more than 5° C.

In a preferred embodiment of the additive manufacturing process for the manufacture of an object in an additive manufacturing apparatus, the orifice of the nozzle has an essentially circular orifice and a diameter of less than 0.64 mm or of 0.05 mm to 0.635 mm and preferably a diameter of less than 0.4 mm or of 0.05 to 0.4 mm, and more preferably of a diameter of less than 0.31 mm or of 0.05 to 0.305 mm or has an essentially rectangular orifice and a diameter of less than 0.64 mm or of 0.05 to 0.635 mm and preferably a diameter of less than 0.4 mm or of 0.05 to 0.4 mm, and more preferably of a diameter of less than 0.31 mm or of 0.05 to 0.305 mm.

It is further an object of the present invention to provide an object obtained by the additive manufacturing process according to the above additive manufacturing process, wherein it comprises or consists of at least one solid filamentous unit having a smallest thickness equal or inferior to 0.2 mm, preferably to 0.15 mm and more preferably to 0.10 mm and most preferably is between 0.01 and 0.10 mm and/or is preferably free from reinforcing fibres such as for example glass fibre or carbon fibre or aramid fibre or high modulus polyolefin. It is understood the smallest thickness corresponds to the diameter in the case the filamentous unit has a circular cross-section. In the case where the filamentous unit has an elliptic cross-section the smallest thickness corresponds to the minor axis. In the case where the filamentous unit has a rectangular cross-section the smallest thickness corresponds to the width. In the case where the filamentous unit has a square cross-section the smallest thickness corresponds to the length of one side. In yet another preferred embodiment, the object obtained by the additive manufacturing process according to the above additive manufacturing process, comprises or consists of one or several solid filamentous units having a smallest thickness equal or inferior to 0.2 mm, preferably to 0.15 mm and more preferably to 0.10 mm and most preferably is between 0.01 and 0.10 mm, wherein in at least a region of the object or in the object as a whole, the one or several solid filamentous units are essentially aligned in parallel in a single direction. In this case, the object is referred to as a being "unidirectional" in said region or as a whole.

In a preferred embodiment of the object obtained by the additive manufacturing process according to the above additive manufacturing process, the object comprises or consists of at least one solid filamentous unit having a Young modulus of 15 GPa or more and up to 50 GPa, preferably of 25 GPa or more and up to 50 GPa, more preferably of 30 GPa or more and up to 50 GPa. In another embodiment, the object comprises or consists of at least a region having a Young modulus of 15 GPa or more, preferably of 20 GPa or more, 25 GPa or more and up to 35 GPa.

In a preferred embodiment of the object obtained by the additive manufacturing process according to the above additive manufacturing process, the object comprises or consists of at least one solid filamentous unit having a tensile strength of 200 MPa or more and up to 1 GPa, preferably of 400 MPa or more and up to 1 GPa, more preferably of up to 600 MPa or more and up to 1 GPa. In another embodiment, the object comprises or consists of at least a region having a tensile strength of 200 MPa and up to 500 MPa, preferably of 300 MPa and up to 500 MPa.

It is further an object of the present invention to provide an additive manufacturing apparatus comprising at least one supply of a polymer composition and configured to carry out the additive manufacturing according to the above, characterized in that the polymer composition comprises a thermotropic liquid crystal polymer as the polymer component of the polymer composition.

In a preferred embodiment of the additive manufacturing apparatus according to the present invention, the polymer component of the polymer composition is a thermotropic liquid crystal polymer obtained by polycondensation of 4-hydroxybenzoic acid and 6-hydroxynaphthalene-2-carboxylic acid.

In a preferred embodiment of the additive manufacturing apparatus according to the present invention, the polymer component of the polymer composition is a thermotropic liquid crystal polymer sold commercially by the Celanese Corporation under the trade name VECTRA® A950.

In a preferred embodiment of the additive manufacturing apparatus according to the present invention, the additive manufacturing apparatus further comprises a build volume equipped with a heating means capable of holding the object in the build envelope at a temperature corresponding to an annealing temperature of the thermotropic liquid crystal polymer. Annealing was found to provide an object exhibiting enhanced mechanical properties, such as an increased modulus of toughness due to a saw-tooth break pattern in the stress-strain curve instead of a single stress peak as it was observed for the non-annealed objects with a broom-like failure mode. By including a build volume equipped with a heating means, the object can be annealed in-situ without the need to transfer the object to a separate annealing chamber.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, LCP refers to a liquid crystal polymer sold commercially by the Celanese Corporation under the trade name Vectra A950, which is a thermotropic liquid crystal polyester.

FIG. 1 shows in a: a false-coloured SEM image of a single tensile-tested filament; in b, c: polarised light microscopy images of filament cross sections of different diameter in both vertical (b) and horizontal (c) filaments; in d: X-ray diffraction patterns of filaments of different diameters; in e: Young's modulus (■) and strength (▲) of vertically extruded filaments in dependence of nozzle diameter; in f: Young's modulus (■) and strength (▲) of horizontally extruded filaments in dependence of layer height; in g: Young's modulus (■) and strength (▲) in dependence of extrusion temperature; in h: tensile strength in dependence of annealing time for horizontal (▲) and vertical filaments (▼).

FIG. 5 shows in a: influence of the layer height on the Young's modulus for 0° (■) and 90° (●) samples, as well as the strength for 0° (▲) and 90° (♦) samples; in b: temperature dependency of the Young's modulus for 0° (■) and 90° (●) samples, as well as the strength for 0° (▲) and 90° (♦) samples; in c: Representative curves for shear stress measurements of non-annealed (solid line) and annealed (dashed line) printed samples; in d: Young's modulus dependency on the annealing time for 0° unidirectional tensile samples; in e: Ultimate tensile strength of unidirectional printed parts dependency on printing orientation for samples with print height of 0.05 mm (■), 0.1 mm (●), 0.15 mm (♦) and 0.2 mm (▲); in f: melt flow index of prisitine LCP pellets, printed samples and annealed printed samples.

DESCRIPTION OF PREFERRED EMBODIMENTS

Figure 2:
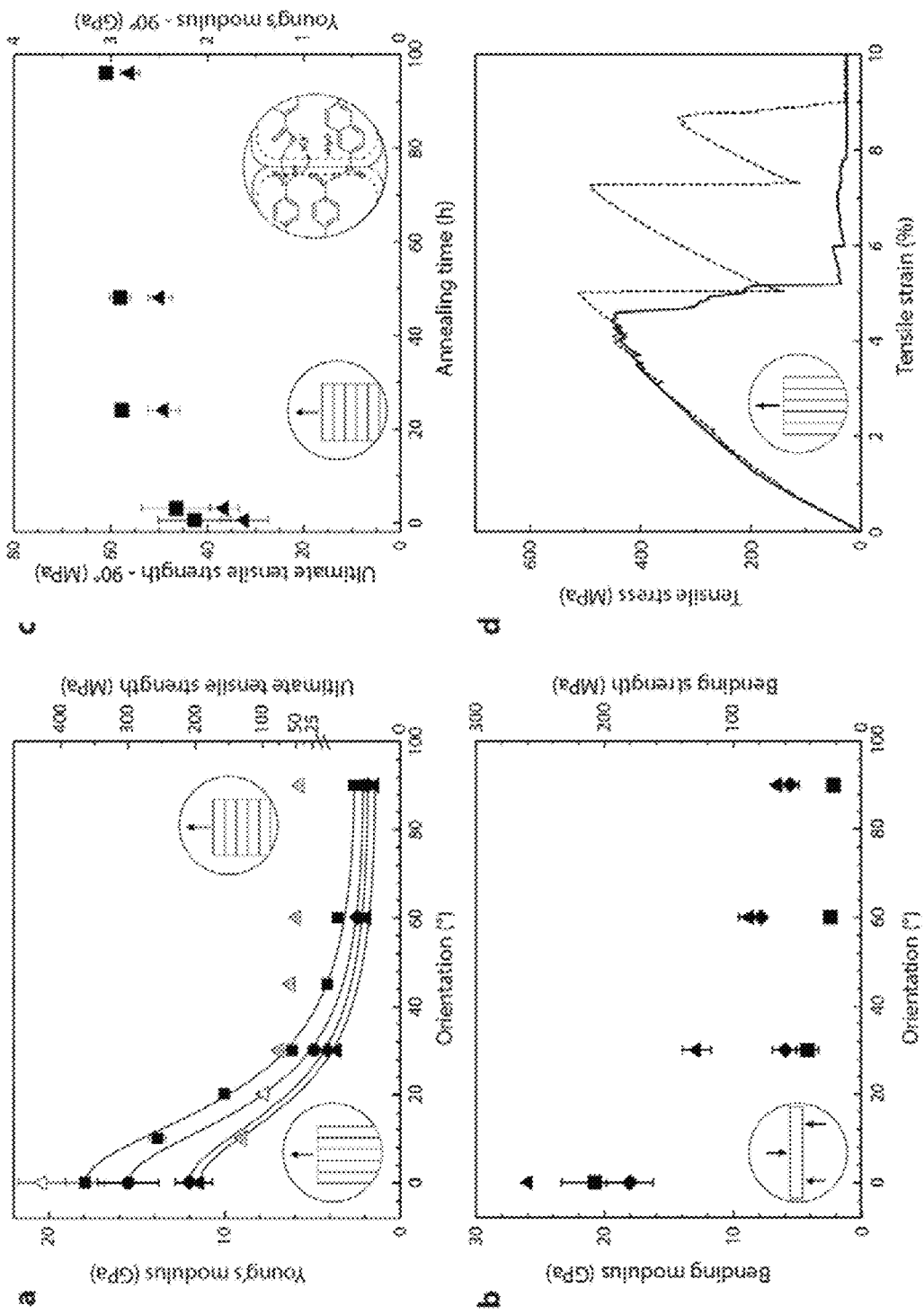
FIG. 2 shows in a: Young's modulus of unidirectional printed parts in dependence of printing orientation for samples with print height of 0.05 mm (■), 0.1 mm (●), 0.15 mm (♦) and 0.2 mm (▲), as well as the strength of 0.05 mm samples (Δ); in b: bending modulus (■) dependency on printing orientation and strength dependency on printing orientation for annealed (▲) and non-annealed (♦) samples; in c: Young's modulus (■) and ultimate tensile strength (▲) in dependence of annealing time for samples with transverse print direction; in d: representative tensile stress-strain curve for annealed (dashed line) and non-annealed (solid line) unidirectional longitudinal samples.
Figure 3:
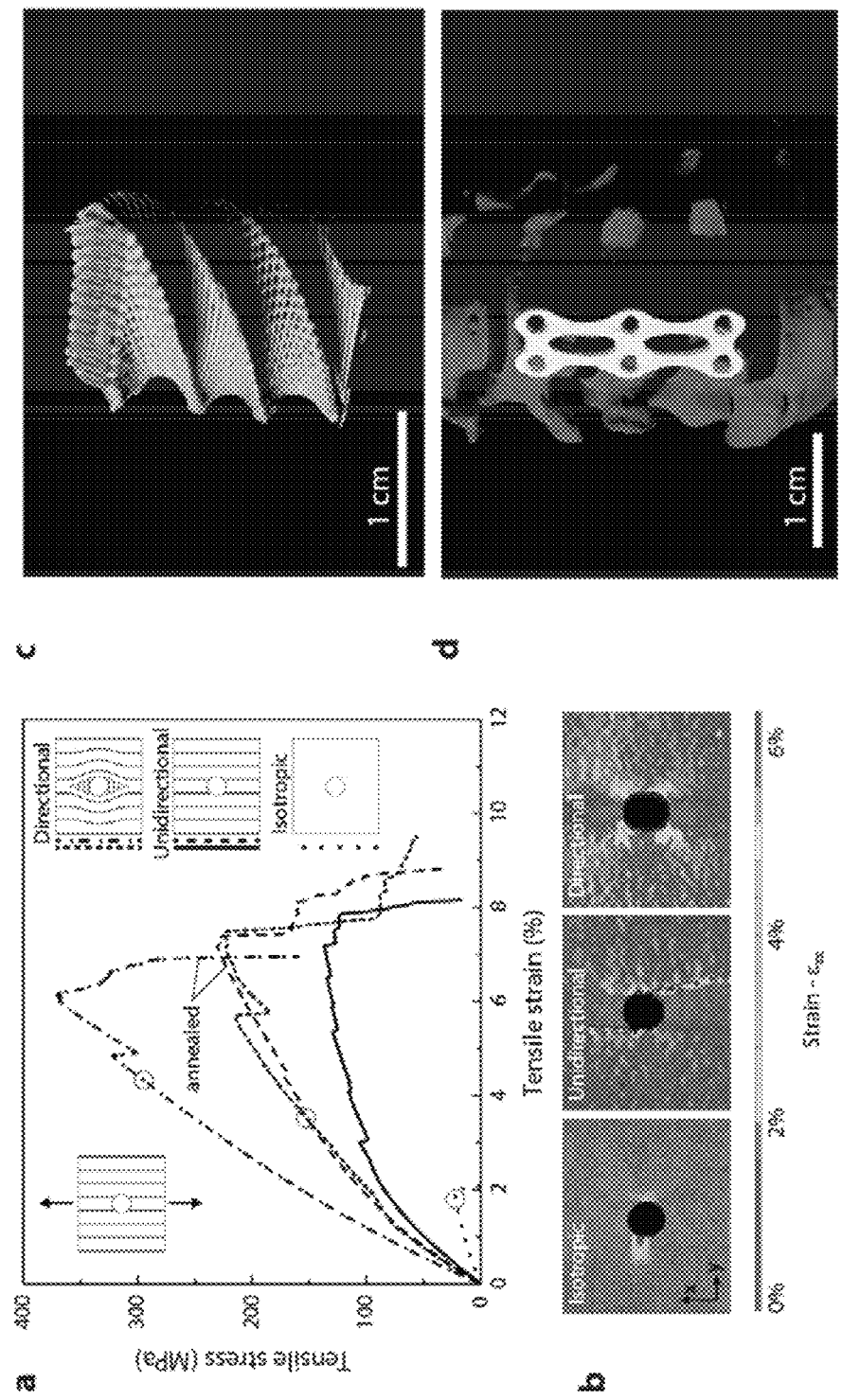
FIG. 3 shows in a: Representative stress-strain curves for open hole tension samples of isotropic (dotted line), unidirectional non-annealed (solid line) and annealed (dashed line), and directional non-annealed (finely dashed line) and annealed (dot/dash line) samples; in b: open hole strain maps measured by digital image correlation before fracture (circle); in c: impact-resistant Bouligand-type structure with twisted plywood arrangement of printed fibres; in d: biomedical implant with a local bearing enhancement where the print lines are programmed to follow the principle stress direction around holes.
Figure 4:
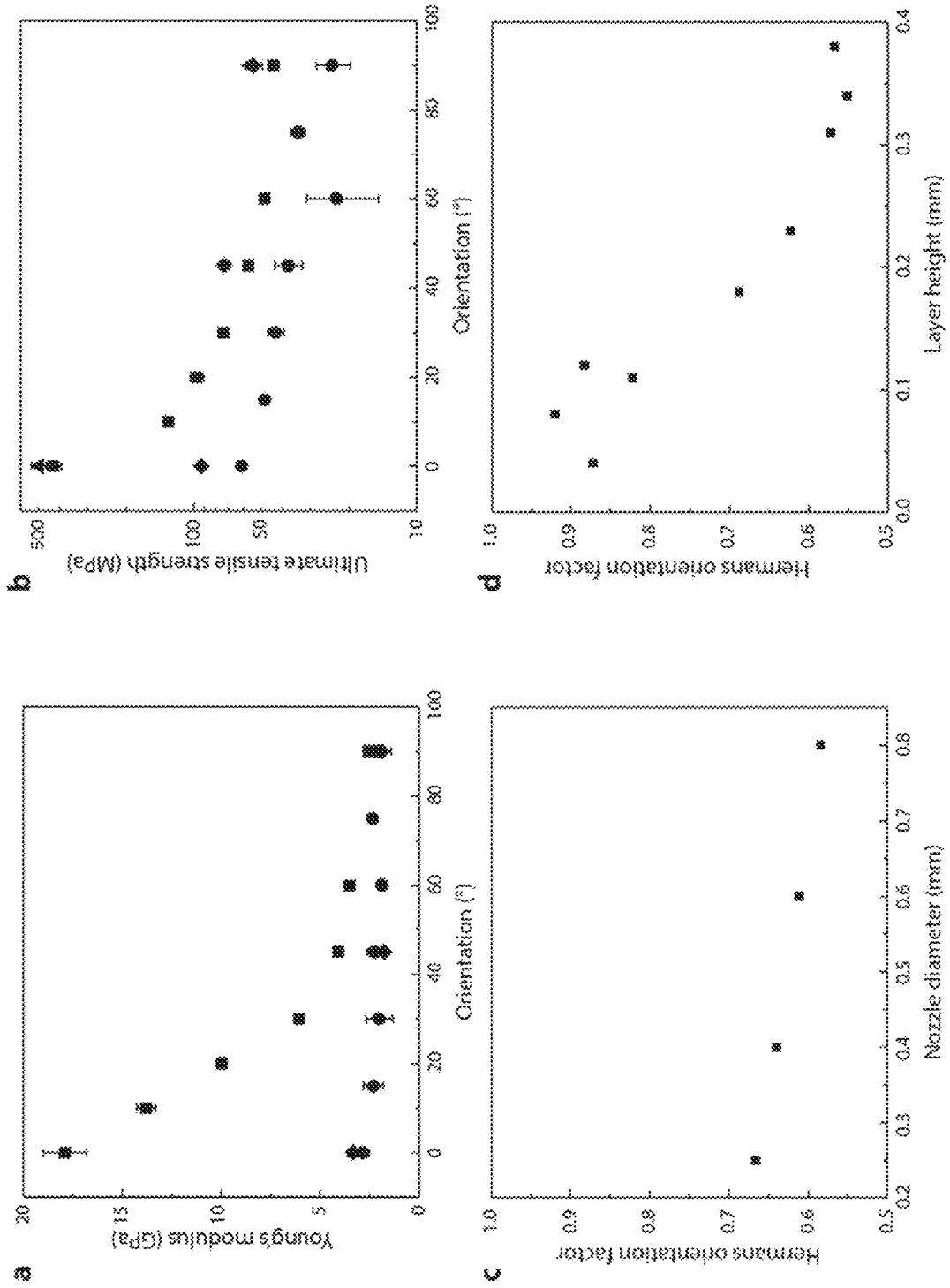
FIG. 4 shows in a: Young's modulus of unidirectional printed parts dependency on printing orientation for samples printed from LCP (■), PLA (●) and PEEK (♦); in b: strength of unidirectional printed parts dependency on printing orientation for samples printed from non-annealed LCP (■), annealed LCP (▲), PLA (●) and PEEK (♦); in c: Hermans orientation factor as a function of the nozzle diameter for vertically printed filaments; in d: Hermans orientation factor as a function of the layer height for horizontally printed filaments.

It is an object of the present invention to provide an additive manufacturing process for the manufacture of an object in an additive manufacturing apparatus according to the subject-matter of the claims.

Additive manufacturing, also referred to as 3D printing, involves manufacturing an object by depositing the constituent material of the object to be manufactured in layer-by-layer fashion. Technologies that can be used to deposit the constituent material of the object to be manufactured in a layer-by-layer fashion include material extrusion, binder jetting, material jetting and directed energy deposition. In the context of the present invention, extrusion technology is of particular interest. Additive manufacturing technologies that employ extrusion to deposit the constituent material of the object to be manufactured of particular note for the purpose of the present invention are fused filament fabrication (FFF) or fused deposition modelling (FDM), since the material for the manufacturing is conveniently available as filament reels or solid subunits of the polymer that are fed to the printer head where the material, in general a polymer composition, is molten before being discharged through the nozzle of the print head according to a predefined path to form the layers making up the entire object, depending on the object being manufactured. It is understood that in the context of the present invention, the number of print heads and/or number of nozzles per print head is not particularly limited. While manufacturing objects according to the present invention on a lab scale is generally done with an additive manufacturing apparatus having a print head with a single nozzle, it is clear that on a larger scale a single additive manufacturing apparatus may be equipped with multiple print heads each having one or more nozzles operating in concert to either speed up the manufacture of a single object or to produce multiple objects in parallel.

In the additive manufacturing process for the manufacture of an object in an additive manufacturing apparatus according to the present invention, the object is formed by one or several individual solid filamentous units, or lines, which are deposited in the additive manufacturing apparatus through the nozzle of the print head in a layer by layer fashion. For example, a first layer is printed, and the nozzle is then elevated and starts to print the next layer and so on until the object is formed. Alternatively, the support platform upon which the first layer is printed is lowered and the nozzle starts to print the next layer.

The print head discharges a polymer composition in a molten state through the nozzle, which nozzle is equipped with a heating means capable of heating the polymer composition to a flowable state, i.e. a state in which the polymer component of the polymer composition, in particular the thermotropic liquid crystalline polymer is in a molten state or a molten liquid crystalline state.

The polymer composition in a molten state is discharged and deposited along at least one predefined path such as to form one or several solid filamentous units of the object to be manufactured. The one or several solid filamentous units may have different cross-sectional shapes such as for example essentially circular, elliptic, rectangular or square.

The object to be manufactured can, in some cases, be manufactured without interrupting the discharging of the polymer composition in a molten state. In other cases, discharging of the polymer composition in a molten state can be interrupted between layers or within layers. However, the mechanical properties are not significantly affected when comparing the case where the object is formed by a single continuous solid filamentous unit and the case where the object is formed by several separated solid filamentous units.

The polymer composition comprises a thermotropic liquid crystal polymer as a polymer component of the polymer composition. It is understood that the polymer composition may thus comprise essentially a single thermotropic liquid crystal polymer as the polymer component of the polymer composition or may comprise a combination of two or more thermotropic liquid crystal polymer as the polymer component of the polymer composition. The polymer composition may comprise other non-polymer components such as for example additives or reinforcing fibres, electrically or thermally conductive fillers, fillers and additives. Suitable reinforcing fibres are for example aramids or inorganic reinforcing fibres such as glass or carbon fibres. The reinforcing fibers, fillers and additives may be dispersed in the polymer composition and may further be aligned in the direction of flow of the polymer composition in the solid filamentous units. Suitable electrically conductive fillers are for example graphene particles or carbon black. Suitable non-conductive fillers are for example titanium dioxide or PTFE. In the context of the present invention, the thermotropic liquid crystal polymer is not particularly limited. In a preferred embodiment of the additive manufacturing process, a thermotropic liquid crystal polymer is the sole polymer component of the polymer composition that is brought into a melt state or the liquid crystalline molten state and more preferably a thermotropic liquid crystal polymer is the sole polymer component of the polymer composition.

Thermotropic liquid crystal polymer particularly suitable for the present invention are aromatic polyester thermotropic liquid crystal polymers, such as thermotropic liquid crystal polymers obtained by polycondensation of 4-hydroxybenzoic acid and 6-hydroxynaphthalene-2-carboxylic acid.

The thermotropic liquid crystal polymer is deposited along a predefined path such that the smallest thickness of the one or several filamentous units is equal or less than 0.2 mm, preferably to 0.15 mm and more preferably to 0.10 mm and most preferably is between 0.1 and 0.01 mm. It is understood that the smallest thickness of the filamentous units of equal or less than 0.2 mm can be achieved by different strategies. On one hand, it is possible to increase the flow of polymer composition flow across a nozzle having a diameter of less than 0.2 mm or on the other hand, it is possible to reduce the flow across a nozzle having a diameter of more than 0.2 mm. Alternatively, the nozzle can be positioned such that the distance between the nozzle orifice and the surface on which the polymer composition melt substrate is deposited is adjusted to the desired smallest diameter, e.g. 0.2 mm, in which case any filamentous unit formed has at least a smallest diameter in z-direction, i.e. the smallest diameter of the deposited filamentous unit corresponds to the vertical height of the deposited filamentous unit or height of the deposited filamentous unit in z-direction. Generally speaking, the z-direction is normal to the plane in which the filamentous units of a layer are deposited.

The polymer composition in a molten state is further actively cooled to form a solid filamentous subunit and is preferably actively cooled to form a solid filamentous subunit by forced convection. Active cooling can be achieved by, for example, providing an additive manufacturing apparatus having a temperature-controlled print enclosure. Forced convection can be achieved by means that are capable of directing a flow of coolant fluid towards the filamentous unit being deposited such as for example fans.

The formed object can be subsequently annealed at less than 100° C., more preferably less than 50° C., most preferred less than 25° C. below the melting temperature of the thermotropic liquid crystal polymer for up to 6 hours, preferably up to 9 hours, more preferably up to 12 hours, most preferably up to 48 hours. In the case where the thermotropic liquid crystal polymer is a polyester obtained by polycondensation of 4-hydroxybenzoic acid and 6-hydroxynaphthalene-2-carboxylic acid, the formed object is preferably annealed at 260 to 280° C. under constant nitrogen flow for up to 96 h.

The polymer composition being discharged in a molten state from a nozzle of a print head can preferably be in a molten liquid crystalline state. In the case where the thermotropic liquid crystal polymer is a polyester obtained by polycondensation of 4-hydroxybenzoic acid and 6-hydroxynaphthalene-2-carboxylic acid, the temperature at which a molten liquid crystalline state exists is between 280 and 320° C.

The polymer composition being discharged in a molten state from a nozzle of a print head can have a temperature not exceeding the melting temperature of thermotropic liquid crystal polymer by more than 100° C., preferably by more than 50° C., preferably by more than 25° C., preferably by more than 15° C., and more preferably by more than 5° C. In the case where the thermotropic liquid crystal polymer is a polyester such as for example the ones obtained by polycondensation of 4-hydroxybenzoic acid and 6-hydroxynaphthalene-2-carboxylic acid, the temperature of the thermotropic liquid crystal polymer being discharged in a molten state corresponds most preferably to 285° C.

The orifice of the nozzle has an essentially circular orifice and a diameter of less than 0.64 mm or of 0.05 to 0.635 mm and preferably a diameter of less than 0.4 mm or of 0.05 to 0.4 mm, and more preferably of a diameter of less than 0.31 mm or of 0.05 to 0.305 mm or has an essentially rectangular orifice and a diameter of less than 0.64 mm or of 0.050 to 0.635 mm and preferably a diameter of less than 0.4 mm or of 0.05 to 0.4 mm, and more preferably of a diameter of less than 0.31 mm or of 0.05 to 0.305 mm. In the case where the smallest diameter of the filamentous subunit is less than the diameter of the orifice of the nozzle, the distance between the underlying material and the orifice of the nozzle is adjusted to correspond to the smallest diameter of the filamentous unit.

EXAMPLES

FDM Filament Fabrication

Liquid crystal polymer VECTRA® A950 (LCP), commercially obtainable from Ticona GmbH, Germany, was dried at 150° C. for 12 hours prior to extrusion. LCP filaments were prepared using a single-screw extruder (Teach-Line® E20 T, Collin, Germany) that was heated to 280, 290, 290 and 260° C. at the 4 zones along its longitudinal axis. The filament was extruded at 60 rpm and collected on a modified flat film line (Teach-Line® CR72 T, Collin, Germany) after cooling it in a water bath (Teach-Line® WB850, Collin, Germany). The speed of the collector rolls was adjusted to achieve a filament diameter of 1.75 mm. The filament was wound on FDM spools and dried at 70° C. for at least 24 hours before use.

FDM Printing Setup

A commercially available Fused Deposition Modelling (FDM) printer (Ultimaker 2+, Ultimaker, Netherlands) was modified with a geared direct drive extruder and an all-metal V6 hotend (E3D, UK) to achieve temperatures up to 400° C. The borosilicate glass build-plate was heated to 90° C. and coated with a thin layer of PVA-based adhesive spray (3DLac, Spain) before printing with LCP to improve bed adhesion and reduce warping. Generally, parts were printed at 295° C. at a speed of 35 mm/s with part cooling fans running at 20%. For printing lines, the speed was reduced to 20 mm/s to improve the quality of lines in contact with the glass surface.

PLA and PEEK reference samples were printed using commercial filaments (Dutch Filaments B.V., Netherlands and 3D4MAKERS, Netherlands) at a temperature of 210° C. and 380° C., respectively. The build-plate was heated to 60° C. for PLA and 120° C. for PEEK. All other parameters were kept the same as for printing LCP. PEEK samples were further heat treated after printing at 150° C. for one hour followed by one hour at 200° C. to reach optimum crystallization.

Print-paths (Gcode) with reduced control over the print directions were generated with Cura, an open source FDM slicer from Ultimaker. A custom slicer using Grasshopper for Rhinoceros (McNeel, Spain) was developed for objects with spatially tuned directional print paths or those where the orientation of the print-path was important.

Thermal Annealing

The solid-state thermal annealing was performed by heating the samples to 270° C. under constant nitrogen flow for 0 to 96 h. It is believed that solid-state cross-linking occurs via post-condensation reactions between carboxylic acid groups of the printed samples. The samples were fixed on a steel plate with polyimide tape to prevent deformation during the annealing process.

Tensile Testing of Printed Filaments (FIG. 1)

Tensile tests were performed on filaments printed vertically starting on the surface (build-plate) and moving upwards (z-direction) and horizontally on the glass surface. To produce vertical filaments that do not curl during freeform extrusion, the feedstock material was first printed horizontally to ensure good attachment to the substrate. Vertical and horizontal filaments were printed with varying nozzle diameter and distance to the surface, respectively. Furthermore, the effects of the nozzle temperature and annealing time were examined for both printing configurations.

The filament samples were glued onto individual paper frames according to ASTM C1557 to assure a constant gauge length of 20 mm. The tensile tests were carried out at a rate of 2 mm/min on an AGS-X (Shimadzu, Japan) universal testing machine with a 1 kN capacity load cell. The samples were imaged with an optical stereo microscope (WILD M10, Leica, Germany) during testing and their width and thickness measured using Fiji image analysis. Data analysis was performed using a custom MATLAB script.

As can be seen from FIG. 1 (a)-(c), the filament exhibits a core-shell structure. In particular, in (a) this is evidenced by the fact that the core of the fibre is still intact whereas the stiffer outer shell of the liquid crystal polymer filament is ruptured. Furthermore, the polarised light microscopy images in (b) and (c) confirm the core-shell structure in both vertical (b) and horizontal (c) filaments, as indicated by the higher illumination of the skin of the printed lines compared to the core. XRD analysis further corroborates a higher fraction of oriented domains in thinner samples in (d). As can be seen from FIG. 1 (e), the Young's modulus and strength of vertically extruded filaments increase with decreasing nozzle diameter. The same effect also translates to horizontally printed filaments, where the Young's modulus and strength increase with decreasing filament thickness, i.e. height, reaching a maximum modulus of 34 GPa and a strength of 800 MPa at 0.05 mm filament height. As can be seen from FIG. 1 (g), increased printing temperatures lead to decreasing Young's modulus. Furthermore, solid-state annealing (h) enhances the mechanical properties by increasing the molecular weight of the polymer, and the strength increases up to 400 MPa for vertically extruded filaments and up to 1 GPa for horizontally printed filaments.

Tensile Testing of Printed Parts (FIG. 2)

Tensile tests were carried out using a Z020 (Zwick, Germany) universal testing machine with a 20 kN capacity load cell. Unidirectional tensile test specimens (ISO 527-5) with a nominal width of 5 mm, length of 110 mm and thickness of 2 mm were printed with print filament orientation varying from 0° to 90° with respect to the testing direction. The samples were supported in the clamping region with bonded glass fibre-reinforced polymer end tabs, resulting in a gauge length of 65 mm. Specimens were tested at a displacement-controlled rate of 2 mm/min. Data analysis was performed using a custom MATLAB script. In addition to the print direction, the effects of different layer heights, temperatures, and annealing time were investigated.

As can be seen from FIG. 2 (a) and (b) the Young's modulus and bending modulus of unidirectional printed parts are dependent on printing orientation and highest when the sample is tested in print direction, i.e. in the direction of main orientation of the filaments constituting the sample. As can be seen in (c), the lesser tensile strength in 90° orientation with respect to the printing direction can be ameliorated, in particular by annealing in excess of 24 hours, due to the improved adhesion between filaments. As can be seen from FIG. 2 (d), for samples with print lines oriented in the loading direction, the fracture mode changes from a broom-like to a tough layer-like fracture due to the improved filament adhesion achieved by thermal annealing (96 h). This change also results in a saw-tooth break pattern in the stress-strain curve, which increases by a factor of 2 the amount of energy required to fracture the part (modulus of toughness).

Tensile testing can also be performed on FDM printed objects, by cutting out a tensile specimen from a region of said object with dimensions according to ISO 527 and ASTM D638 for polymers, ISO 527 and ASTM D3039 for composites and ASTM C1273 and ISO 15490 for ceramics and testing said tensile specimen in a tensile test machine to measure the Young's modulus and tensile strength according to the standards listed above.

Bending Tests of Printed Parts

Bending tests were carried out on a AGS-X (Shimadzu, Japan) universal testing machine with a three-point bending setup using a span of 24 mm. Samples with different thicknesses (layer heights) were measured before and after annealing at a displacement controlled rate of 2 mm/min. The specimen geometry and the bending testing setup were chosen in accordance with ISO 14125. A span-to-thickness ratio of 16 was used to assure a flexural stress state with a limited influence of the constant shear stress within the specimen.

LIST OF REFERENCE SIGNS none

The invention claimed is:

1. An additive manufacturing process for the manufacture of an object in an additive manufacturing apparatus, wherein the object is formed by one or several individual solid filamentous units, said additive manufacturing process comprising the steps of, discharging a polymer composition in a molten state from a nozzle of a print head, thereby imparting an orienting flow on said polymer composition in a molten state being discharged from said nozzle of the print head and depositing the discharged polymer composition in a molten state along at least one predefined path and allowing the thus formed one or several filamentous units to solidify such as to form one or several solid filamentous units of the object to be manufactured;

optionally repeating the previous step until the object is formed;

wherein said polymer composition consists of a thermotropic liquid crystal polymer as the polymer component of the polymer composition or consists of a thermotropic liquid crystal polymer as the polymer component of the polymer composition and non-polymer additives or reinforcing fibres, characterized in that the smallest thickness of the one or several filamentous units is equal or less than 0.2 mm.

2. The additive manufacturing process according to claim 1, wherein the polymer composition being discharged in a molten state from a nozzle of a print head is in a molten liquid crystalline state.

3. The additive manufacturing process according to claim 1, wherein the polymer composition in a molten state is further actively cooled to form a solid filamentous unit.

4. The additive manufacturing process according to claim 1, wherein the formed object is subsequently annealed at less than 100° C. below the melting temperature of the thermotropic liquid crystal polymer for up to 6 hours.

5. The additive manufacturing process according to claim 1, wherein polymer composition in a molten liquid crystalline state is discharged from a nozzle of the print head along a non-rectilinear path.

6. The additive manufacturing process according to claim 1, wherein the thermotropic liquid crystal polymer is an aromatic polyester.

7. The additive manufacturing process according to claim 1, wherein the polymer composition being discharged in a molten state from a nozzle of a print head has a temperature not exceeding the melting temperature of the thermotropic liquid crystal polymer by more than 50° C.

8. The additive manufacturing process according to claim 1, wherein the orifice of the nozzle has an essentially circular orifice and a diameter of less than 0.64 mm or has an essentially rectangular orifice and a diameter of less than 0.64 mm.

9. The additive manufacturing process according to claim 1, wherein the at least one predefined path is a predefined horizontal path.

10. The additive manufacturing process according to claim 1, wherein the smallest thickness of the one or several filamentous units is equal or less than 0.15 mm.

11. The additive manufacturing process according to claim 1, wherein the smallest thickness of the one or several filamentous units is equal or less than 0.10 mm.

12. The additive manufacturing process according to claim 1, wherein the smallest thickness of the one or several filamentous units is between 0.1 and 0.01 mm.

13. The additive manufacturing process according to claim 1, wherein the polymer composition in a molten state is further actively cooled to form a solid filamentous unit by forced convection.

14. The additive manufacturing process according to claim 1, wherein the formed object is subsequently annealed at less than 50° C. below the melting temperature of the thermotropic liquid crystal polymer for up to 6 hours.

15. The additive manufacturing process according to claim 1, wherein the formed object is subsequently annealed at less than 25° C. below the melting temperature of the thermotropic liquid crystal polymer for up to 6 hours.

16. The additive manufacturing process according to claim 1, wherein the thermotropic liquid crystal polymer is a polyester obtained by polycondensation of 4-hydroxybenzoic acid and 6-hydroxynaphthalene-2-carboxylic acid.

17. The additive manufacturing process according to claim 1, wherein the polymer composition being discharged in a molten state from a nozzle of a print head has a temperature not exceeding the melting temperature of the thermotropic liquid crystal polymer by more than 25° C.

18. The additive manufacturing process according to claim 1, wherein the polymer composition being discharged in a molten state from a nozzle of a print head has a temperature not exceeding the melting temperature of the thermotropic liquid crystal polymer by more than 15° C.

19. The additive manufacturing process according to claim 1, wherein the polymer composition being discharged in a molten state from a nozzle of a print head has a temperature not exceeding the melting temperature of the thermotropic liquid crystal polymer by more than 5° C.

20. The additive manufacturing process according to claim 1, wherein the orifice of the nozzle has an essentially circular orifice and a diameter of 0.05 to 0.635 mm or has an essentially rectangular orifice and a diameter of 0.05 to 0.635 µm.

21. The additive manufacturing process according to claim 1, wherein the orifice of the nozzle has an essentially circular orifice and a diameter of 0.05 to 0.4 mm, or has an essentially rectangular orifice and a diameter of 0.05 to 0.4 mm.

22. The additive manufacturing process according to claim 1, wherein the orifice of the nozzle has an essentially circular orifice and a diameter of 0.05 to 0.305 mm or has an essentially rectangular orifice and a diameter of 0.05 to 0.305 mm.

\* \* \* \* \*